3,632,636
N-ARYL-OMEGA-AMINOACIDS
Peter H. L. Wei, Upper Darby, and Stanley C. Bell, Penn Valley, Pa., assignors to American Home Products Corporation, New York, N.Y.
No Drawing. Filed June 11, 1968, Ser. No. 735,979
Int. Cl. C07c 101/44
U.S. Cl. 260—517  3 Claims

ABSTRACT OF THE DISCLOSURE

The disclosure is directed to N-aryl-omega-aminoacids and a method for their preparation. The compounds have central nervous system activity as depressants.

This invention relates to new and novel N-aryl-omega-aminoacids which in standard and accepted pharmacological tests have demonstrated pharmacological activity as central nervous system depressants.

The compounds within the purview of the present invention are exemplified by those having the following formula:

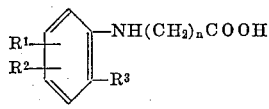

where $R^1$ is hydrogen, halogen, lower alkyl or lower alkoxy;
$R^2$ is hydrogen, halogen or sulfamoyl;
$R^3$ is halogen, lower alkyl, lower alkoxy or benzoyl; and
$n$ is an integer from 2 to about 4.

As used herein the terms "lower alkyl," "lower alkoxy" and the like describe groups containing from about 1 to 8 carbon atoms.

Typical examples of the compounds of this invention which are depicted by structural Formula I are 4-(2-benzoyl - 4 - chloro-anilino)butyric acid and N-(2,6-dichlorophenyl)-β-alanine.

The new and novel compounds of this invention may be prepared by the process which is hereinafter schematically illustrated:

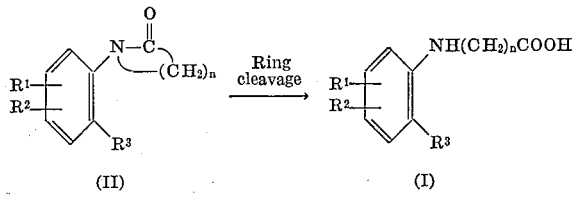

where $R^1$, $R^2$, $R^3$ and $n$ are as defined above.

The starting materials for the present invention are described in the U.S. patent application of P. H. L. Wei and S. C. Bell entitled "A Process for the Preparation of N-Aryl-α-Oxo-Cyclopolymethylene Amines and Related Compounds" filed on June 10, 1968 as Ser. No. 735,534. In that application it is disclosed that a 2-substituted aniline is reacted with at least one mole of a halo alkanoyl halide in an organic solution at a temperature range of about room temperature to reflux temperature for a period of about 1 to about 4 hours affording a haloalkanoyl anilide, which is then separated by standard procedures. The above-prepared haloalkanoyl anilide is then reacted with at least one mole of an alkali metal cyanide in an alkanol, in the presence of a catalytic amount of sodium iodide for a period of about 1 to 20 hours at a temperature range of 60 to 100° C., preferably at the reflux temperature, affording the product an N-aryl-α-oxocyclopolymethylene amine which may be purified according to well known methods.

To prepare the N-aryl-omega-amino acids (I) of the present invention, an N-aryl-α-oxocyclopolymethylene amine (II) is suspended or dissolved in an aqueous solution containing an alkali metal hydroxide, such as sodium hydroxide. The reaction mixture is then heated at a temperature range of about 60° C. to reflux temperature for a period of about 10 to 24 hours. When the reaction is complete, any impurities are removed and the solution is acidified, for instance with acetic acid, affording the product. The product may be purified by well known means, for instance settling, drying and recrystallization from an organic solvent, such as cyclohexane.

The new and novel N-aryl-omega-aminoacids of the present invention have utility in standard pharmacological testing and have exhibited central nervous system activity as depressants. That is, they produce a calming effect in the host.

In the pharmacological evaluation of the biological activity of the compounds of this invention the in vivo effects are tested as follows: The compound is administered orally to three mice (14 to 24 grams) at each of the following doses: 400, 127, 40 and 12.7 milligrams per kilogram of host body weight. The animals are watched for a minimum of two hours during which time signs of general stimulation (that is increased spontaneous motor activity, hyperactivity on tactile stimulation, twitching), general depression (that is, decreased spontaneous motor activity, decreased respiration) and autonomic activity (that is, miosis, mydriasis) are noted.

The N-aryl-omega aminoacids of the present invention induce central nervous system depressant effects at an oral dose range of 400 milligrams per kilogram of host body weight.

When the compounds of this invention are employed as described above, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

EXAMPLE 1

This example illustrates the preparation of N-(2-benzoyl-4,6-dichlorophenyl)-β-alanine.

One gram (1.0 g.) of 3,5-dichloro-2-(2-oxo-1-azetidinyl)benzophenone is suspended in 30 milliliters of a 1 N NaOH solution and the mixture heated on a steam bath until the solution is complete. After removal of a small amount of impurity, the solution is acidified with acetic acid. An oil is separated which upon standing solidifies. The crude material is collected, recrystallized from cyclohexane, to give 0.8 g. of yellow N-(2-benzoyl-4,6-dichlorophenyl-β-alanine) having a melting point of 112–114° C.

Based on the formula $C_{16}H_{13}Cl_{12}NO_3$ it is calculated that the elemental analysis by weight would be 56.82 percent carbon, 3.87 percent hydrogen, 4.14 percent nitrogen, and 20.96 percent chlorine. The product is analysed and the content is found to be 57.00 percent carbon, 3.73 percent hydrogen, 4.27 percent nitrogen and 20.56 percent chlorine. The foregoing may be expressed:

Analysis.—Calculated for $C_{16}H_{13}Cl_{12}NO_3$ (percent): C, 56.82; H, 3.87; Cl, 20.96; N, 4.14. Found (percent): C, 57.00; H, 3.73; Cl, 20.56; N, 4.27.

EXAMPLES 2–9

Following the procedure of Example 1, but substituting the following starting materials for 3,5-dichloro-2-(2-oxo-1-azetidinyl)benzophenone the following products are obtained:

| Example | Starting material | Product |
|---|---|---|
| 2 | 1-(2-benzoyl-4,6-difluorophenyl)piperidin-2-one. | 5-(2-benzoyl-4,6-difluoroanilino)valeric acid. |
| 3 | 1-(2-benzoyl-4,5-diiodophenyl)pyrrolidin-2-one. | 4-(2-benzoyl-4,5-diiodoanilino)butyric acid. |
| 4 | 1-(d-benzoyl-3,5-dimethylphenyl)piperidin-2-one. | 5-(2-benzoyl-3,5-dimethylanilino)valeric acid. |
| 5 | 1-(2-benzoyl-4,6-dibutylphenyl)azetidin-2-one. | N-(2-benzoyl-4,6-dibutylphenyl)-β-alanine. |
| 6 | 1-(2-benzoyl-3-ethyl-5-propylphenyl)pyrrolidin-2-one. | 4-(2-benzoyl-3-ethyl-5-propylanilino)butyric acid. |
| 7 | 1-(2-benzoyl-4,6-dimethoxyphenyl)pyrrolidin-2-one. | 4-(2-benzoyl-4,6-dimethoxyoxanilino)butyric acid. |
| 8 | 1-(2-benzoyl-3,5-dibutoxyphenyl)piperidin-2-one. | 5-(2-benzoyl-3,5-dibutoxyanilino)valeric acid. |
| 9 | 1-(2-benzoyl-5-ethoxy-3-propoxyphenyl)azetidin-2-one. | N-(2-benzoyl-5-ethoxy-3-propoxyphenyl)-β-alanine. |

EXAMPLE 10

This example illustrates the preparation of 4-(2-benzoyl-4-chloroanilino)butyric acid.

One and five-tenths grams (1.5 g.) of 1-(2-benzoyl-4-chlorophenyl)pyrrolidin-2-one is suspended in 50 ml. of 1 N NaOH and the mixture heated in a steam bath overnight. After removal of impurities by filtration, the solution is acidified with acetic acid. A yellow solid is collected, dried and recrystallized from cyclohexane to give 1.0 g. of 4-(2-benzoyl-4-chloroanilino)butyric acid having a melting point of 155–157° C.

Analysis.—Calculated for $C_{17}H_{16}ClNO_3$ (percent): C, 64.24; H, 5.08; Cl, 11.15; N, 4.41. Found (percent): C, 64.35; H, 4.73; Cl, 11.13; N, 4.15.

EXAMPLES 11–16

Following the procedure of Example 10, but substituting the following starting materials for 1-(2-benzoyl-4-chlorophenyl)pyrrolidin-2-one, the following products are obtained:

| Example | Starting material | Product |
|---|---|---|
| 11 | 1-(2-benzoyl-4-bromophenyl)-azetidin-2-one. | N-(2-benzoyl-4-bromophenyl)-β-alanine. |
| 12 | 1-(2-benzoyl-6-fluorophenyl)-pyrrolidin-2-one. | 4-(2-benzoyl-6-fluoroanilino)butyric acid. |
| 13 | 1-(2-benzoyl-5-iodophenyl)-piperidin-2-one. | 5-(2-benzoyl-5-iodoanilino)valeric acid. |
| 14 | 1-(2-benzoyl-4-methylphenyl)-azetidin-2-one. | N-(2-benzoyl-4-methylphenyl)-β-alanine. |
| 15 | 1-(2-benzoyl-5-butylphenyl)-phenyl)-pyrrolidin-2-one. | 4-(2-benzoyl-5-butylanilino)butyric acid. |
| 16 | 1-(2-benzoyl-3-methoxyphenyl)-azetidin-2-one. | N-(2-benzoyl-3-methoxyphenyl)-β-alanine. |

EXAMPLE 17

This example illustrates the preparation of N-(2,6-dichlorophenyl)-β-alanine.

Two grams (2.0 g.) of 1-(2,6-dichlorophenyl)-2-azetidinone is dissolved in 100 ml. of 1 N NaOH soution and the solution heated on a steam bath for 15 hours. The solution is cooled and extracted with benzene. The aqeuous solution is first treated with Darco and acidified with acetic acid. An oily material separates and solidifies upon standing. The crude material (2.0 g.) is collected and when recrystallized from cyclohexane has a melting point of 61–63° C.

Analysis.—Calculated for $C_9H_9Cl_2NO_2$ (percent): C, 46.17; H, 3.88; Cl, 30.29; N, 5.98. Found (percent): C, 45.66; H, 3.81; Cl, 30.23; N, 5.86.

EXAMPLES 18–22

Following the procedure of Example 17, but substituting the following starting materials for 1-(2,6-dichlorophenyl)-2-azetidinone, the following products are obtained:

| Example | Starting material | Product |
|---|---|---|
| 18 | 1-(2,4-difluorophenyl)-2-pyrrolidinone. | 4-(2,4-difluoroanilino)-butyric acid. |
| 19 | 1-(2-chloro-3-fluorophenyl)-2-piperidinone. | 5-(2-chloro-3-fluoroanilino)-valeric acid. |
| 20 | 1-(2,4-dimethylphenyl)-2-piperidinone. | 5-(2,4-dimethylanilino)-valeric acid. |
| 21 | 1-(4-methoxy-2-propoxyphenyl)-2-azetidinone. | N-(4-methoxy-2-propoxyphenyl)-β-alanine. |
| 22 | 1-(2,5-dibutoxyphenyl)-2-pyrrolidinone. | 4-(2,5-dibutoxyanilino)-butyric acid. |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound selected from the group having the formula:

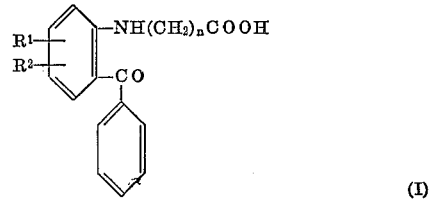

(I)

where $R^1$ is selected from the group consisting of hydrogen and halogen, lower alkyl and lower alkoxy; $R^2$ is selected from the group consisting of hydrogen, halogen and sulfamoyl; and
$n$ is an integer from 2 to 4.

2. A compound as defined in claim 1 which is N-(2-benzoyl-4,6-dichlorophenyl)-β-alanine.

3. A compound as defined in claim 1 which is 4-(2-benzoyl-4-chloroanilino)butyric acid.

References Cited

UNITED STATES PATENTS 3,359,278    12/1967    Wallingford _____ 260—518 A

JAMES A. PATTEN, Primary Examiner

V. GARNER, Assistant Examiner

U.S. Cl. X.R.

260—239 A, 239.4 F, 294.7 F, 326.5 F, 326.5 SF, 518 R, 518 A, 519; 424—319